United States Patent
Tan et al.

(10) Patent No.: US 12,053,889 B2
(45) Date of Patent: Aug. 6, 2024

(54) KINEMATICS MODEL-FREE TRAJECTORY TRACKING METHOD FOR ROBOTIC ARMS AND ROBOTIC ARM SYSTEM

(71) Applicant: SUN YAT-SEN UNIVERSITY, Guangdong (CN)

(72) Inventors: Ning Tan, Guangdong (CN); Mao Zhang, Guangdong (CN); Peng Yu, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 363 days.

(21) Appl. No.: 17/642,237

(22) PCT Filed: Sep. 18, 2020

(86) PCT No.: PCT/CN2020/116186
§ 371 (c)(1),
(2) Date: Mar. 11, 2022

(87) PCT Pub. No.: WO2021/135405
PCT Pub. Date: Jul. 8, 2021

(65) Prior Publication Data
US 2022/0314445 A1    Oct. 6, 2022

(30) Foreign Application Priority Data

Jan. 2, 2020  (CN) .......................... 202010003310.4

(51) Int. Cl.
*B25J 9/16* (2006.01)

(52) U.S. Cl.
CPC ........... *B25J 9/1664* (2013.01); *B25J 9/1607* (2013.01); *B25J 9/1694* (2013.01); *G05B 2219/32335* (2013.01); *G05B 2219/39001* (2013.01)

(58) Field of Classification Search
None
See application file for complete search history.

(56) References Cited

U.S. PATENT DOCUMENTS 5,216,342 A * 6/1993 Torii ...................... G05B 19/19
318/609

FOREIGN PATENT DOCUMENTS

| CN | 105598968 | 5/2016 |
|---|---|---|
| CN | 108621162 | 10/2018 |

(Continued)

OTHER PUBLICATIONS

Ning Tan, Peng Yu, Xinyu Zhang, Tao Wang, Model-free motion control of continuum robots based on a zeroing neurodynamic approach, IEEE Oct. 19, 2020 (Year: 2020).*

(Continued)

*Primary Examiner* — Jaime Figueroa
*Assistant Examiner* — Atticus A Cameron
(74) *Attorney, Agent, or Firm* — JCIPRNET

(57) ABSTRACT

A kinematics model-free trajectory tracking method for a robotic arm includes the following steps. Obtain an actual trajectory equation $r_a(t)$ of the robotic arm at time t according to a sensor, and combines the actual trajectory equation $r_a(t)$ with a predetermined target trajectory equation $r_d(t)$ to obtain a first error function e(t). Obtain a differential equation (I) of a state change rate of a driver of the robotic arm. Obtain a second error function ε(t). Pass the second error function c(t) through the applied gradient neural network to obtain equation (IV). Jointly solve equation (I) and equation (IV) to obtain an joint state vector θ(t) of the robotic arm. Drive a motion of the robotic arm by a controller according to the joint state vector θ(t) of the robotic arm to complete trajectory tracking.

13 Claims, 3 Drawing Sheets

(56) References Cited

FOREIGN PATENT DOCUMENTS

| | | | |
|---|---|---|---|
| CN | 108621162 A | * | 10/2018 |
| CN | 109159151 | | 1/2019 |
| CN | 110434851 | | 11/2019 |
| CN | 110977992 | | 4/2020 |
| EP | 0426873 | | 5/1991 |

OTHER PUBLICATIONS

Dechau Chen, Yunong Zhang, Shuai Li, Tracking Control of Robot Manipulators with Unknown Models: A Jacobian-Matrix-Adaption Method, IEEE Jul. 2018 (Year: 2018).*

Ning Tan, Peng Yu, Robust model-free control for redundant robotic manipulators based on zeroing neural networks activated by non-linear functions, Elsevior BV Jan. 26, 2021 (Year: 2021).*

"International Search Report (Form PCT/ISA/210) of PCT/CN2020/116186", mailed on Nov. 27, 2020, with English translation thereof, pp. 1-4.

* cited by examiner

US 12,053,889 B2

KINEMATICS MODEL-FREE TRAJECTORY TRACKING METHOD FOR ROBOTIC ARMS AND ROBOTIC ARM SYSTEM

CROSS-REFERENCE TO RELATED APPLICATION

This application is a 371 of international application of PCT application serial no. PCT/CN2020/116186, filed on Sep. 18, 2020, which claims the priority benefit of China application no. 202010003310.4, filed on Jan. 2, 2020. The entirety of each of the above mentioned patent applications is hereby incorporated by reference herein and made a part of this specification.

TECHNICAL FIELD

The invention relates to the field of control of a robotic arm, and more particularly, to a kinematics model-free trajectory tracking method for a robotic arm and a robotic arm system.

BACKGROUND TECHNIQUE

Industrial robots, also known as robotic arms, have a wide range of applications and play a great role in modern industrial production. Robotic technology is an intelligent technology formed by interdisciplinary and comprehensive integration. At the same time, the birth of robots and the establishment and development of robotics are the embodiment of important achievements in the development of modern science and technology. The Jacobian matrix plays an important role in the kinematics and real-time control of the robot. As the mapping between the speed of the drive joint and that of the end effector, the Jacobian matrix plays an important role in the analysis, control and performance evaluation of the robot and the like. Most existing robotic arm control techniques rely on its kinematic model, that is, to control based on the Jacobian matrix and its pseudo-inverse. However, in practice, the model of the robotic arm is often unknown; or, even if the theoretical model is basically known, the actual model is difficult to obtain accurately due to the existence of parameter uncertainty, thereby leads to a lower accuracy of the target trajectory of the robotic arm.

SUMMARY OF THE INVENTION

In order to overcome the deficiencies of the above-mentioned prior art and methods, the present invention proposes a kinematics model-free trajectory tracking method for a robotic arm and a robotic arm system. The present invention can complete the tracking task only by relying on the target trajectory information and the measurement result of the sensor under the circumstance that the parameters of the industrial robot model are unknown, and the accuracy of the trajectory tracking can be controlled by changing the size of the equation parameters.

In order to solve the above technical problem, the technical solution of the present invention is as follows:

A kinematics model-free trajectory tracking method for a robotic arm which comprises steps of:
  obtaining an actual trajectory equation $r_a(t)$ of the robotic arm at time t according to a sensor, and combining the actual trajectory equation $r_a(t)$ with a predetermined target trajectory equation $r_d(t)$ to obtain a first error function $e(t)$;
  passing the first error function $e(t)$ through an applied gradient neural network to obtain a differential equation $\dot{\theta}(t)$ of a state change rate of a driver of the robotic arm;
  obtaining a second error function $\varepsilon(t)$ according to an actual speed $\dot{r}_a$ of an end effector of the robotic arm obtained from the sensor and a product $\hat{J}(\theta(t))\dot{\theta}(t)$ of a Jacobian matrix and a driver rate;
  passing the second error function $\varepsilon(t)$ through the applied gradient neural network to obtain $\hat{J}(\theta(t))$;
  jointly solving $\dot{\theta}(t)$ and $\hat{J}(\theta(t))$ to obtain a joint state vector $\theta(t)$ of the robotic arm;
  driving a motion of the robotic arm by a controller according to the joint state vector $\theta(t)$ of the robotic arm to complete trajectory tracking.

The applied gradient neural network in the present invention is a kind of recursive neural network based on the gradient descent method, which is often used for finding the inverse of a matrix and solving linear equations.

The present invention can complete the tracking task only by relying on the target trajectory information and the measurement result of the sensor under the circumstance that the parameters of the industrial robot model are unknown, and the accuracy of the trajectory tracking can be controlled by changing the size of the equation parameters.

In a preferred solution, the $e(t)$ is expressed by the following formula:

$$e(t)=\|r_d(t)-r_a(t)\|_2^2$$

wherein, the $r_d(t)$ represents a predetermined target trajectory equation at time t.

In a preferred solution, the $\dot{\theta}(t)$ is expressed by the following formula:

$$\dot{\theta}(t)=\gamma \hat{J}(\theta(t))^T(r_d(t)-r_a(t))$$

wherein, the shown $\dot{\theta}(t)$ represents a first derivative of $\theta(t)$ at time t, the $\hat{J}(\theta(t))$ represents the Jacobian matrix, and the $\gamma$ represents a preset positive convergence parameter.

In a preferred solution, the $\varepsilon(t)$ is expressed by the following formula:

$$\varepsilon(t)=\|\dot{r}_a(t)-\hat{J}(\theta(t))\dot{\theta}(t)\|_2^2$$

wherein the actual speed $\dot{r}_a$, (t) represents a first derivative of $r_a(t)$ at time t.

In a preferred solution, the $\hat{J}(\theta(t))$ is expressed by the following formula:

$$\dot{\hat{J}}(\theta(t))=\mu(\dot{r}_a(t)-\hat{J}(\theta(t))\dot{\theta}(t))\dot{\theta}(t)$$

wherein the $\dot{\hat{J}}(\theta(t))$ represents a first derivative of $\hat{J}(\theta(t))$ at time t, and the $\mu$ represents the preset positive convergence parameter.

In a preferred solution, the $\gamma=500$.
In a preferred solution, the $\mu=500$.

The present invention further discloses a robotic arm system based on the above-mentioned method, and the robotic arm system comprises a robotic arm, a controller and a sensor, wherein,
  the sensor is used for measuring and collecting a working data of the robotic arm, and the sensor is disposed on the robotic arm and is electrically connected to the controller;
  working of the robotic arm is controlled by the controller according to the working data collected by the sensor, and the controller is electrically connected to the robotic arm.

Compared with the prior art, the technical solution of the present invention has the following beneficial effects:

The present invention can complete the tracking task only by relying on the target trajectory information and the measurement result of the sensor under the circumstance that the parameters of the industrial robot model are unknown, and the accuracy of the trajectory tracking can be controlled by changing the size of the equation parameters.

DRAWINGS

DETAILED IMPLEMENTATION

The drawings are for illustrative purposes only and are not to be construed as limiting the invention. In order to better illustrate the embodiment, some components of the drawings may be omitted, enlarged or reduced, and do not represent the actual product size.

It will be apparent to those skilled in the art that certain known structures and their description may be omitted. The technical solution of the present invention will be further described below with reference to the accompanying drawings and embodiments.

Embodiment

Figure 1:
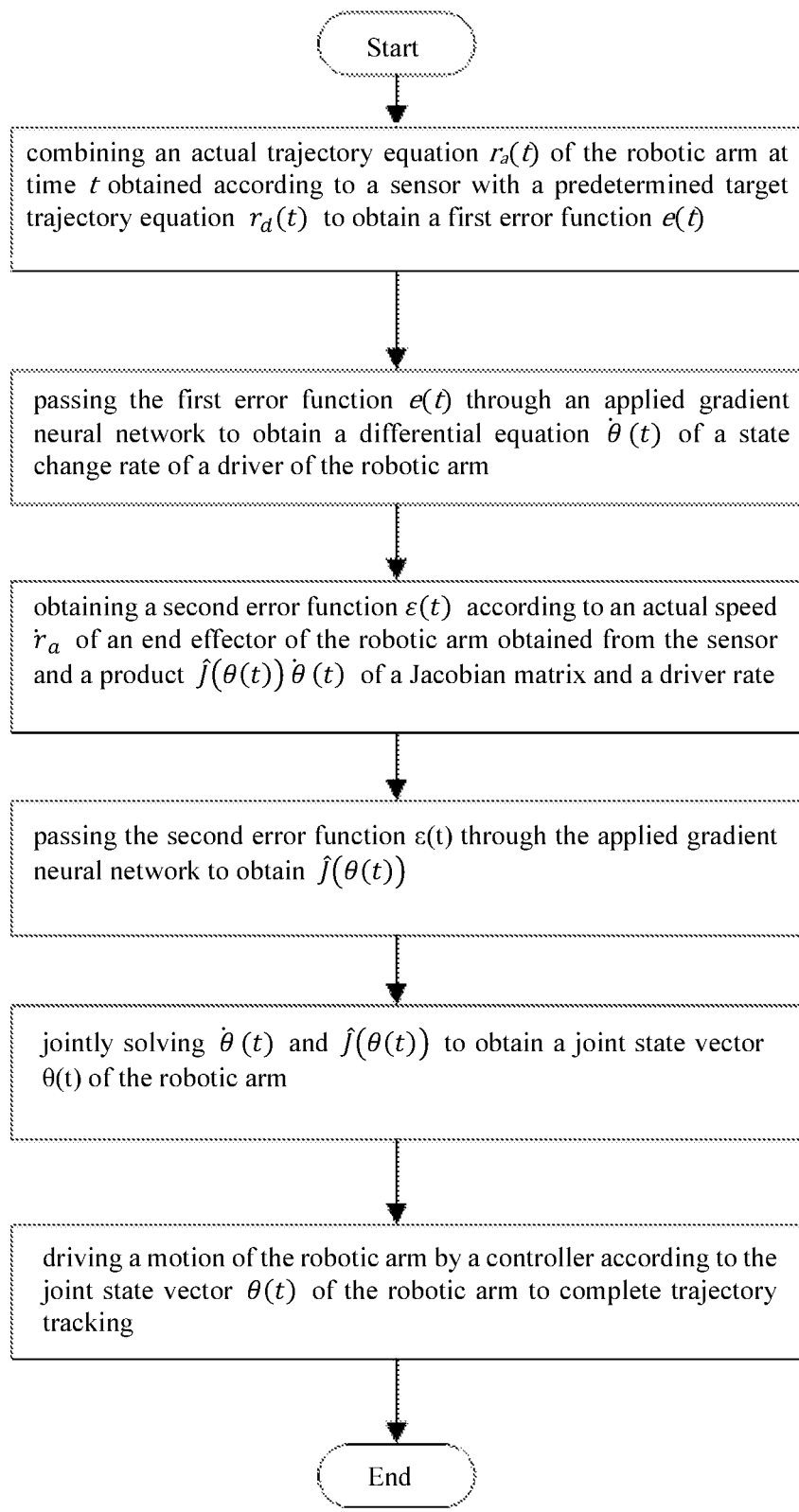
FIG. 1 is a flow chart of an embodiment.

As shown in FIG. 1, a kinematics model-free trajectory tracking method for a robotic arm which comprises steps of:

obtaining an actual trajectory equation $r_a(t)$ of the robotic arm at time t according to a sensor, and combining the actual trajectory equation $r_a(t)$ with a predetermined target trajectory equation $r_d(t)$ to obtain a first error function e(t);

passing the first error function e(t) through an applied gradient neural network to obtain a differential equation $\dot{\theta}(t)$ of a state change rate of a driver of the robotic arm;

obtaining a second error function $\varepsilon(t)$ according to an actual speed $\dot{r}_a$, of an end effector of the robotic arm obtained from the sensor and a product $\hat{J}(\theta(t))\dot{\theta}(t)$ of a Jacobian matrix and a driver rate;

passing the second error function c(t) through the applied gradient neural network to obtain $\hat{J}(\theta(t))$;

jointly solving $\theta(t)$ and $\hat{J}(\theta(t))$ to obtain a joint state vector $\theta(t)$ of the robotic arm;

driving a motion of the robotic arm by a controller according to the joint state vector $\theta(t)$ of the robotic arm to complete trajectory tracking.

The present invention can complete the tracking task only by relying on the target trajectory information and the measurement result of the sensor under the circumstance that the parameters of the industrial robot model are unknown, and the accuracy of the trajectory tracking can be controlled by changing the size of the equation parameters.

On the basis of the embodiment, the following improvements can be further made: the e(t) is expressed by the following formula:

$$e(t)=\|r_d(t)-r_a(t)\|_2^2$$

wherein, the $r_d(t)$ represents a predetermined target trajectory equation at time t.

On the basis of the embodiment and the improved embodiment, the following improvements can be further made: the $\dot{\theta}(t)$ is expressed by the following formula:

$$\dot{\theta}(t)=\gamma \hat{J}(\theta(t))^T(r_d(t)-r_a(t))$$

wherein, the shown $\dot{\theta}(t)$ represents a first derivative of $\theta(t)$ at time t, the $\hat{J}(t))$ represents the Jacobian matrix, and the $\gamma$ represents a preset positive convergence parameter.

On the basis of the embodiment and the improved embodiment, the following improvements can be further made: the $\varepsilon(t)$ is expressed by the following formula:

$$\varepsilon(t=\|\dot{r}_a(t)-\hat{J}(\theta(t))\dot{\theta}(t)\|_2^2$$

wherein the shown actual speed $\dot{r}_a$, (t) represents a first derivative of $r_a(t)$ at time t.

On the basis of the embodiment and the improved embodiment, the following improvements can be further made: the $\hat{J}(\theta(t))$ is expressed by the following formula:

$$\dot{\hat{J}}(\theta(t))=\mu(\dot{r}_a(t)-\hat{J}(\theta(t))\dot{\theta}(t))\dot{\theta}(t)$$

wherein the $\dot{\hat{J}}(\theta(t))$ represents a first derivative of $\hat{J}(\theta(t))$ at time t, and the $\mu$ represents the preset positive convergence parameter.

On the basis of the embodiment and the improved embodiment, the following improvements can be further made: the $\gamma=500$.

On the basis of the embodiment and the improved embodiment, the following improvements can be further made: the $\mu=500$.

The present invention further discloses a robotic arm system based on the above-mentioned method, and the robotic arm system comprises a robotic arm, a controller and a sensor, wherein, the sensor is used for measuring and collecting a working data of the robotic arm, and the sensor is disposed on the robotic arm and is electrically connected to the controller;

working of the robotic arm is controlled by the controller according to the working data collected by the sensor, and the controller is electrically connected to the robotic arm.

Test Environment:

Use the PA10 robotic arm to verify the present embodiment, and the robotic arm has a total of 7 degrees of freedom. The initial value of each joint: q(0)=[0; π/4; 0; π/2; 0;−π/4; 0], the corresponding initial value of the Jacobian matrix is:

$$J(0) = \begin{bmatrix} 0, & 0.7518, & 0, & 0.4336, & 0, & 0.080, & 0 \\ 0.0354, & 0, & 0.5566, & 0, & -0.0566, & 0, & 0 \\ 0, & -0.0354, & 0, & -0.3536, & 0, & -1.7764e-17, & 0 \end{bmatrix}$$

First, an error function is defined according to the target trajectory $r_d(t)$ and the actual trajectory $r_a(t)$ of the continuum robot end effector measured by the sensor:

$$e(t)=\|r_d(t)-r_a(t)\|_2^2$$

Applied gradient neural network solution method:

$$\frac{d\theta(t)}{dt}=-\frac{\gamma}{2}\frac{\partial e(\theta)}{\partial \theta}$$

The differential equation for a state change rate of the driver is obtained:

$$\dot{\theta}(t)=\gamma \hat{J}(\theta(t))^T(r_d(t)-r_a(t))$$

wherein $\gamma$ is a positive parameter that adjusts the error convergence speed, and in this test, $\gamma=500$;

Since $J(\theta(t))$ is unknown, its value needs to be estimated, and the estimated Jacobian matrix can be expressed as $\hat{J}(\theta(t))$, and the following formula $\dot{\theta}(t)$ can be obtained:

$$\dot{\theta}(t)=\gamma \hat{J}(\theta(t))^T(r_d(t)-r_a(t))$$

To estimate the value of the Jacobian matrix, a second error function can be defined based on the actual trajectory rate measured by the sensor and the value of $\hat{J}(\theta(t))\dot{\theta}(t)$:

$$\varepsilon(t)=\|\dot{r}_a(t)-\hat{J}(\theta(t))\dot{\theta}(t)\|_2^2$$

Applied gradient neural network solution method:

$$\frac{d\hat{J}(\theta(t))}{dt}=-\frac{\mu}{2}\frac{\partial\varepsilon(\hat{J})}{\partial\hat{J}}$$

The following differential equations of the differentiated Jacobian matrix $\hat{J}(\theta(t))$ are obtained:

$$\dot{\hat{J}}(\theta(t))=\mu(\dot{r}_a(t)-\hat{J}(\theta(t))\dot{\theta}(t))\dot{\theta}(t)$$

wherein the $\dot{\hat{J}}(\theta(t))$ represents a first derivative of Jacobian matrix, $\dot{r}_a(t)$ the actual trajectory rate and $\mu$ is a positive parameter that adjusts the error convergence rate, $\mu=500$ in this test.

Figure 2:
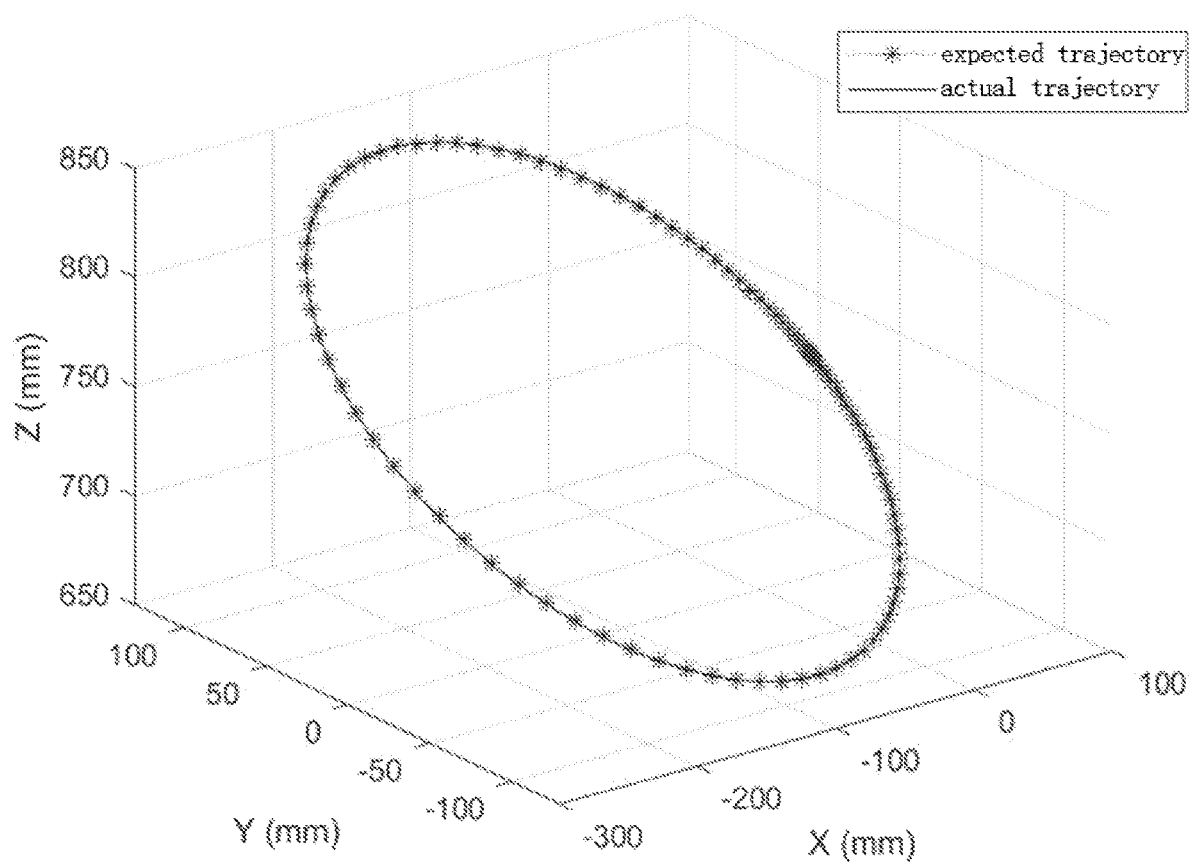
FIG. 2 is a schematic graph of an expected trajectory and an actual trajectory tracking of the embodiment.
Figure 3:
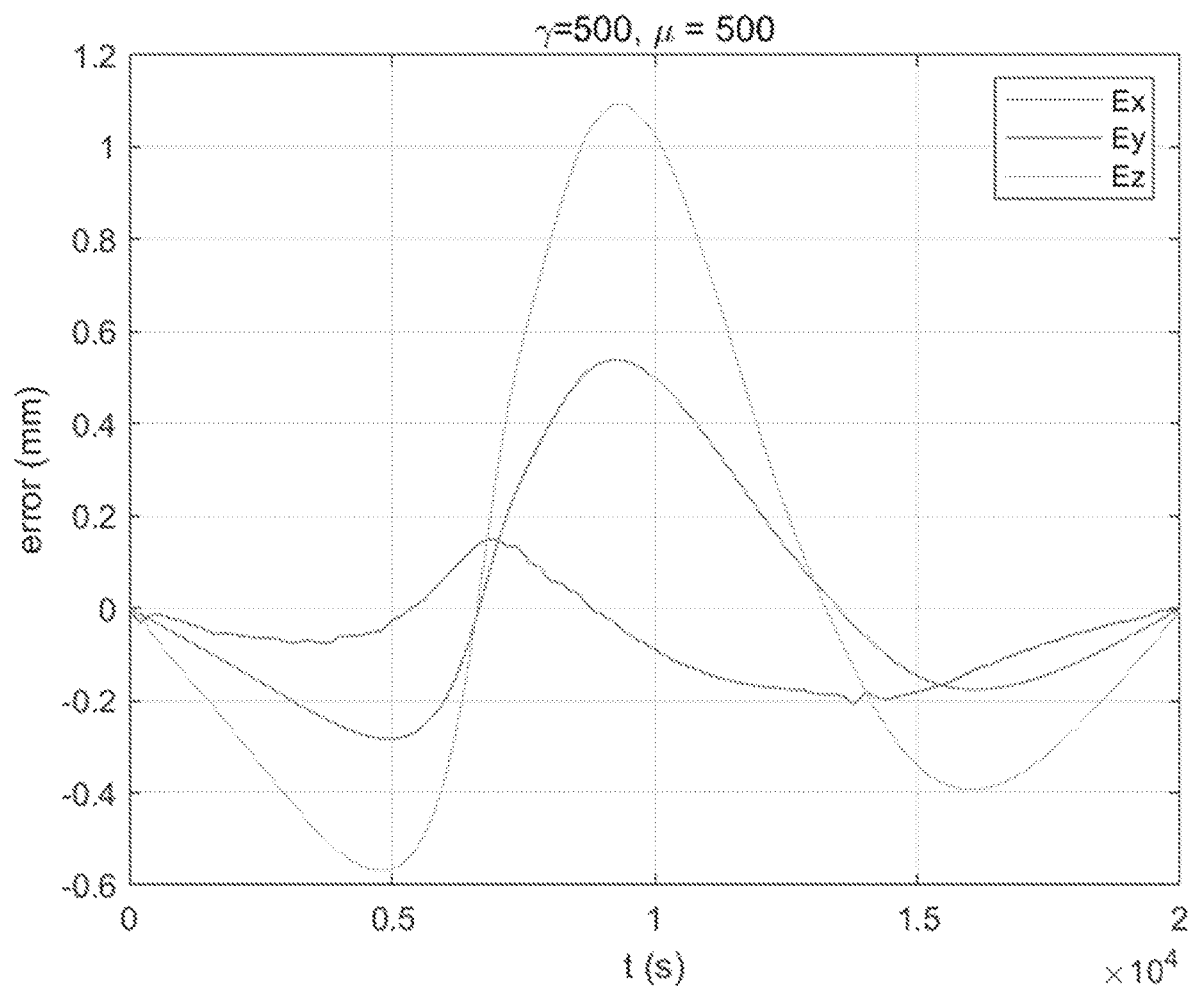
FIG. 3 is a schematic graph of errors of three coordinate X, Y, and Z corresponding to the trajectory tracking of the embodiment.

Finally, using the numerical method and the given initial value to solve the equation system composed of the above two error differential equations, the required signal $\theta(t)$ for driving the robotic arm can be obtained. The schematic graph of the expected trajectory and the actual trajectory tracking is as shown in FIG. 2, and the errors of three coordinates X, Y, and Z corresponding to the trajectory tracking are as shown in FIG. 3. Therefore, it can be found that the present embodiment can complete the high-precision tracking task only by relying on the target trajectory information and the measurement result of the sensor under the circumstance that the parameters of the industrial robot model are unknown.

In the specific content of the above-mentioned specific embodiment, the technical features can be combined in any non-contradictory combination. For the sake of brevity, not all the possible combinations of the above-mentioned technical features are described. However, as long as the combination of these technical features does not exist conflict, it should be considered within the scope of this specification.

The terms describing the positional relationship in the accompanying drawings are only used for exemplary illustration, and should not be construed as a limitation on the present patent.

Obviously, the above-mentioned embodiments of the present invention are only examples for clearly illustrating the present invention, and are not intended to limit the implementation of the present invention. For those of ordinary skill in the art, changes or modifications in other different forms can also be made on the basis of the above description. Therefore, it is not possible to exhaustively list all implementations. Any modifications, equivalent replacements and improvements made within the spirit and principle of the present invention shall be included within the protection scope of the claims of the present invention.

What is claimed:

1. A kinematics model-free trajectory tracking method for a robotic arm, wherein the method comprises steps of:
    obtaining an actual trajectory equation $r_a(t)$ of the robotic arm at time t according to a sensor, and combining the actual trajectory equation $r_a(t)$ with a predetermined target trajectory equation $r_d(t)$ to obtain a first error function e(t);
    passing the first error function e(t) through a gradient neural network to obtain a driver rate $\dot{\theta}(t)$ of the robotic arm;
    obtaining a second error function $\varepsilon(t)$ according to an actual speed $\dot{r}_a$ of an end effector of the robotic arm obtained from the sensor and a product $\hat{J}(\theta(t))\dot{\theta}(t)$ of a Jacobian matrix and a driver rate;
    passing the second error function $\varepsilon(t)$ through the gradient neural network to obtain $\hat{J}(\theta(t))$;
    jointly solving $\dot{\theta}(t)$ and $\hat{J}(\theta(t))$ to obtain a joint state vector $\theta(t)$ of the robotic arm;
    driving a motion of the robotic arm by a controller according to the joint state vector $\theta(t)$ of the robotic arm to complete trajectory tracking;
    the e(t) is expressed by the following formula:

$$e(t)=\|r_d(t)-r_a(t)\|_2^2$$

wherein, the $r_d(t)$ represents a predetermined target trajectory equation at time t, and $\|\cdot\|_2$ represents a 2-norm of a vector;

the $\dot{\theta}$ (t) is expressed by the following formula:

$$\dot{\theta}(t)=\gamma\hat{J}(\theta(t))^T(r_d(t)-r_a(t))$$

wherein, the shown $\dot{\theta}(t)$ represents a first derivative of $\theta(t)$ at time t, the $\hat{J}(\theta(t))$ represents the Jacobian matrix, and the $\gamma$ represents a preset positive convergence parameter.

2. The kinematics model-free trajectory tracking method according to the claim 1, wherein the $\varepsilon(t)$ is expressed by the following formula:

$$\varepsilon(t)=\|\dot{r}_a(t)-\hat{J}(\theta(t))\dot{\theta}(t)\|_2^2$$

wherein the actual speed $\dot{r}_a(t)$ represents a first derivative of $r_a(t)$ at time t.

3. The kinematics model-free trajectory tracking method according to claim 2, wherein in the $\hat{J}(\theta(t))$ is expressed by the following formula:

$$\dot{\hat{J}}(\theta(t))=\mu(\dot{r}_a(t)-\hat{J}(\theta(t))\dot{\theta}(t))\dot{\theta}(t)$$

wherein the $\dot{\hat{J}}(\theta(t))$ represents a first derivative of $\hat{J}(\theta(t))$ at time t, and the $\mu$ represents the preset positive convergence parameter.

4. The kinematics model-free trajectory tracking method according to claim 3, wherein the $\mu=500$.

5. The kinematics model-free trajectory tracking method according to claim 1, characterized in that, wherein the $\gamma=500$.

6. A robotic arm system based on the kinematics model-free trajectory tracking method according to claim 1, wherein the robotic arm system comprises a robotic arm, a controller and a sensor, wherein,
    the sensor is used for measuring and collecting a working data of the robotic arm, and the sensor is disposed on the robotic arm and is electrically connected to the controller;
    working of the robotic arm is controlled by the controller according to the working data collected by the sensor, and the controller is electrically connected to the robotic arm.

7. The kinematics model-free trajectory tracking method according to claim 2, wherein the $\gamma=500$.

8. The kinematics model-free trajectory tracking method according to claim 3, wherein the $\gamma=500$.

9. The kinematics model-free trajectory tracking method according to claim 4, wherein the $\gamma=500$.

10. A robotic arm system based on the kinematics model-free trajectory tracking method according to claim 2, wherein the robotic arm system comprises a robotic arm, a controller and a sensor, wherein, the sensor is used for measuring and collecting a working data of the robotic arm, and the sensor is disposed on the robotic arm and is electrically connected to the controller;

working of the robotic arm is controlled by the controller according to the working data collected by the sensor, and the controller is electrically connected to the robotic arm.

11. A robotic arm system based on the kinematics model-free trajectory tracking method according to claim 3, wherein the robotic arm system comprises a robotic arm, a controller and a sensor, wherein, the sensor is used for measuring and collecting a working data of the robotic arm, and the sensor is disposed on the robotic arm and is electrically connected to the controller;

working of the robotic arm is controlled by the controller according to the working data collected by the sensor, and the controller is electrically connected to the robotic arm.

12. A robotic arm system based on the kinematics model-free trajectory tracking method according to claim 4, wherein the robotic arm system comprises a robotic arm, a controller and a sensor, wherein, the sensor is used for measuring and collecting a working data of the robotic arm, and the sensor is disposed on the robotic arm and is electrically connected to the controller;

working of the robotic arm is controlled by the controller according to the working data collected by the sensor, and the controller is electrically connected to the robotic arm.

13. A robotic arm system based on the kinematics model-free trajectory tracking method according to claim 5, wherein the robotic arm system comprises a robotic arm, a controller and a sensor, wherein, the sensor is used for measuring and collecting a working data of the robotic arm, and the sensor is disposed on the robotic arm and is electrically connected to the controller;

working of the robotic arm is controlled by the controller according to the working data collected by the sensor, and the controller is electrically connected to the robotic arm.

\* \* \* \* \*